United States Patent
Qiu et al.

(10) Patent No.: US 12,328,774 B2
(45) Date of Patent: Jun. 10, 2025

(54) SYSTEM AND METHOD FOR CONFIGURING TRANSMISSION RESOURCES AND PERFORMING RACH IN WIRELESS COMMUNICATION NETWORKS

(71) Applicant: ZTE CORPORATION, Guangdong (CN)

(72) Inventors: Zhihong Qiu, Shenzhen (CN); He Huang, Shenzhen (CN); Yuan Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 439 days.

(21) Appl. No.: 17/704,968

(22) Filed: Mar. 25, 2022

(65) Prior Publication Data
US 2022/0217790 A1    Jul. 7, 2022

Related U.S. Application Data

(63) Continuation of application No. PCT/CN2019/109532, filed on Sep. 30, 2019.

(51) Int. Cl.
*H04W 74/0833* (2024.01)
*H04W 56/00* (2009.01)
(Continued)

(52) U.S. Cl.
CPC ..... *H04W 74/0841* (2013.01); *H04W 56/005* (2013.01); *H04W 72/02* (2013.01); *H04W 72/0446* (2013.01); *H04W 74/0866* (2013.01)

(58) Field of Classification Search
CPC ............ H04W 74/0841; H04W 74/02; H04W 74/0446; H04W 56/005
See application file for complete search history.

(56) References Cited

U.S. PATENT DOCUMENTS

2016/0338021 A1* 11/2016 Chae .................. H04W 72/23
2018/0124724 A1   5/2018 Tsai et al.
(Continued)

FOREIGN PATENT DOCUMENTS

WO   WO-2018/064367 A1   4/2018
WO   WO-2018/201966 A1   11/2018
(Continued)

OTHER PUBLICATIONS

First Office Action and Search Report on CN 201980100867.5 dated Jun. 6, 2023 (with English translation, 16 pages).
(Continued)

*Primary Examiner* — Jamal Javaid
*Assistant Examiner* — Ryan C Kavleski
(74) *Attorney, Agent, or Firm* — Foley & Lardner LLP

(57) ABSTRACT

A system and method for communication between a wireless communication device and a wireless communication node based on usage of timing advance estimated by the wireless communication device are disclosed herein. In one embodiment, the system and method are configured to determine, by a wireless communication device, usage of a timing advance (TA) estimated by the wireless communication device for communication with the wireless communication node; select, by the wireless communication device, a RACH type to communicate with the wireless communication node; and initiate, by the wireless communication device, a RACH communication with the wireless communication node according to the selected RACH type and the determination on usage of TA estimated by the wireless communication device.

19 Claims, 5 Drawing Sheets

(51) Int. Cl.
*H04W 72/02* (2009.01)
*H04W 72/0446* (2023.01)
*H04W 74/08* (2009.01)

(56) References Cited

U.S. PATENT DOCUMENTS

| | | | |
|---|---|---|---|
| 2019/0208550 A1* | 7/2019 | Ko | H04W 72/0446 |
| 2019/0215220 A1 | 7/2019 | Islam et al. | |
| 2020/0236715 A1* | 7/2020 | Akkarakaran | H04W 74/0891 |
| 2020/0252967 A1* | 8/2020 | Ozturk | H04W 4/70 |
| 2021/0185628 A1* | 6/2021 | Huang | G01S 19/05 |
| 2022/0086786 A1* | 3/2022 | Narasimha | H04W 74/0833 |

FOREIGN PATENT DOCUMENTS

| | | |
|---|---|---|
| WO | WO-2019/096994 A1 | 5/2019 |
| WO | WO-2019/098906 A1 | 5/2019 |

OTHER PUBLICATIONS

First Office Action for JP Appl. No. 2022-519701, dated Jun. 13, 2023 (with English translation, 12 pages).

Panasonic, "Timing advance and RACH aspect for NTN", 3GPP TSG RAN WG1 #98, R1-1908818, Aug. 30, 2019, Prague, Czech Republic (12 pages).

ZTE et al., "Report of Email Discussion [106#70] [NR/NTN] RACH capacity/procedures," 3GPP TSG-RAN WG2 Meeting #107, R2-1909256, Prague, Czech, Aug. 26-30, 2019 (38 pages).

Catt "PRACH design and UL timing advance," 3GPP TSG RAN WG1 Meeting #97; May 13-17, 2019; R1-1906325; Reno, USA (7 pages).

Extended European Search Report for EP Patent Application No. 19947776.1 dated Sep. 6, 2022.

Oppo "Discussion on timing advance in NTN RACH," 3GPP TSG-RAN WG2 Meeting #107; Aug. 26-30, 2019; R2-1909753; Prague, Czech (3 pages).

PCL "Discussion on timing advance and RACH for NTN," 3GPP TSG RAN WG1 Meeting #98; Aug. 26-30, 2019; R1-1908129; Prague, CZ (4 pages).

ZTE Email Discussion Rapporteur "Procedures and mgsB content [105bis#30][NR/2-step RACH]," 3GPP TSG-WG2 Meeting #106; May 13-17, 2019; R2-1906308; Reno, USA (91 pages).

International Search Report and Written Opinion for PCT Appl. No. PCT/CN2019/109532 mailed Jun. 30, 2020.

Nokia "Serving Cell TA Estimation for Multilateration Positioning"; 3GPP TS G RAN WG6 #3; Feb. 13-17, 2017; 7 Pages; R6-170045; Athens, Greece.

\* cited by examiner

SYSTEM AND METHOD FOR CONFIGURING TRANSMISSION RESOURCES AND PERFORMING RACH IN WIRELESS COMMUNICATION NETWORKS

CROSS-REFERENCE TO RELATED APPLICATION

This application claims the benefit of priority under 35 U.S.C. § 120 as a continuation of PCT Patent Application No. PCT/CN2019/109532, filed on Sep. 30, 2019, the disclosure of which is incorporated herein by reference in its entirety.

TECHNICAL FIELD

The disclosure relates generally to wireless communications and, more particularly, to systems and methods for configuring transmission resources and performing random access channel (RACH) communications in wireless communication networks.

BACKGROUND

Wireless communication networks can include network communication devices and network communication nodes. In some instances, the network communication devices can be terrestrial, and at least one of the network communication nodes can be non-terrestrial, such as, for example, on-board a satellite.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a first wireless communication node includes determining, by a wireless communication device, usage of timing advance (TA) estimated by the wireless communication device for communication with a wireless communication node. The method further includes selecting, by the wireless communication device, a RACH type to communicate with the wireless communication node. The method also includes initiating, by the wireless communication device, a RACH communication with the wireless communication node according to the selected RACH type and the determination on usage of TA estimated by the wireless communication device.

In another embodiment, a method performed by a wireless communication device includes performing, by a wireless communication device, a cell search within a communication cell for communication signals. The method further includes detecting, by the wireless communication device, an indication that system information is transmitted according to a satellite beam based configuration. The method also includes accessing, by the wireless communication device, the system information according to the satellite beam based configuration.

In another embodiment, a method performed by a wireless communication node includes transmitting, by a wireless communication node, RACH resource configuration information indicating usage of timing advance (TA) estimated by a wireless communication node. The method further includes receiving, by a wireless communication node, a Msg1 of a RACH procedure from the wireless communication device. The method also includes transmitting, by the wireless communication node responsive to receiving the Msg1 of the RACH procedure, a response message including a TA indicator to the wireless communication device.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
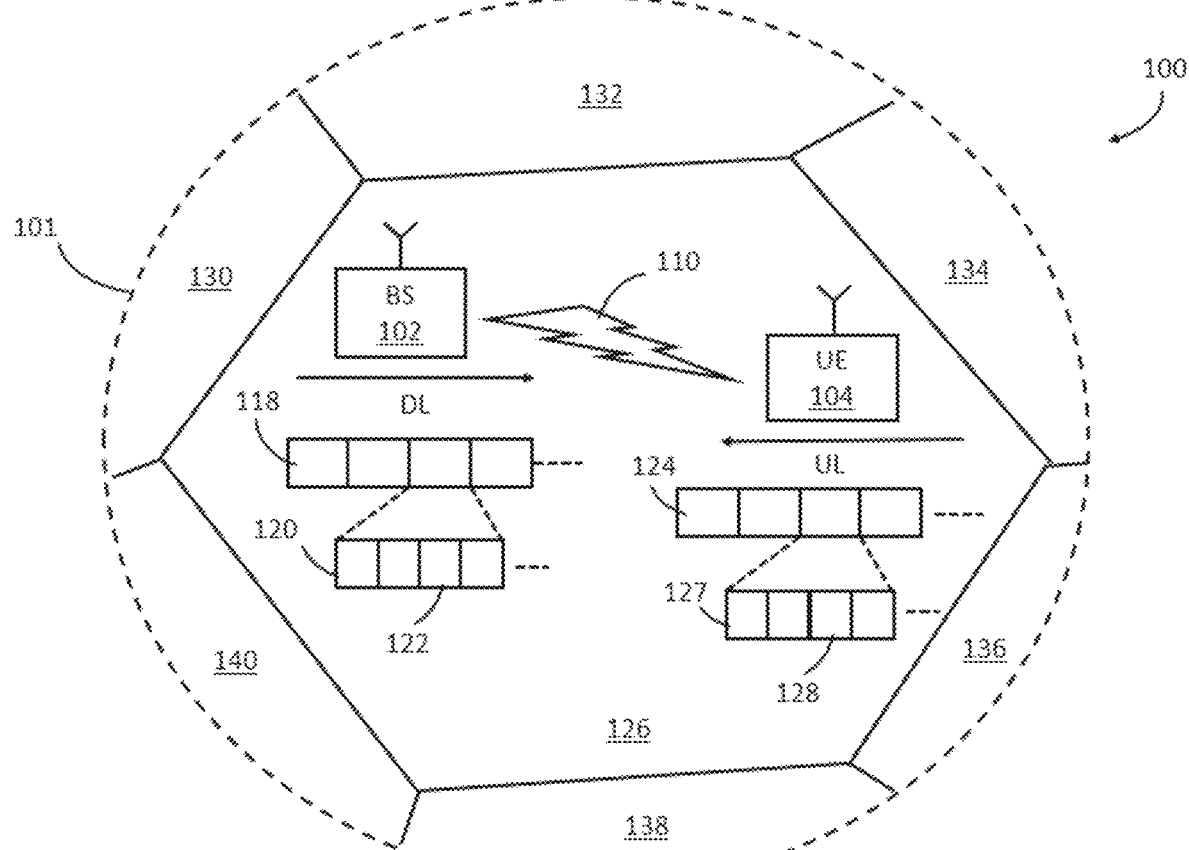
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
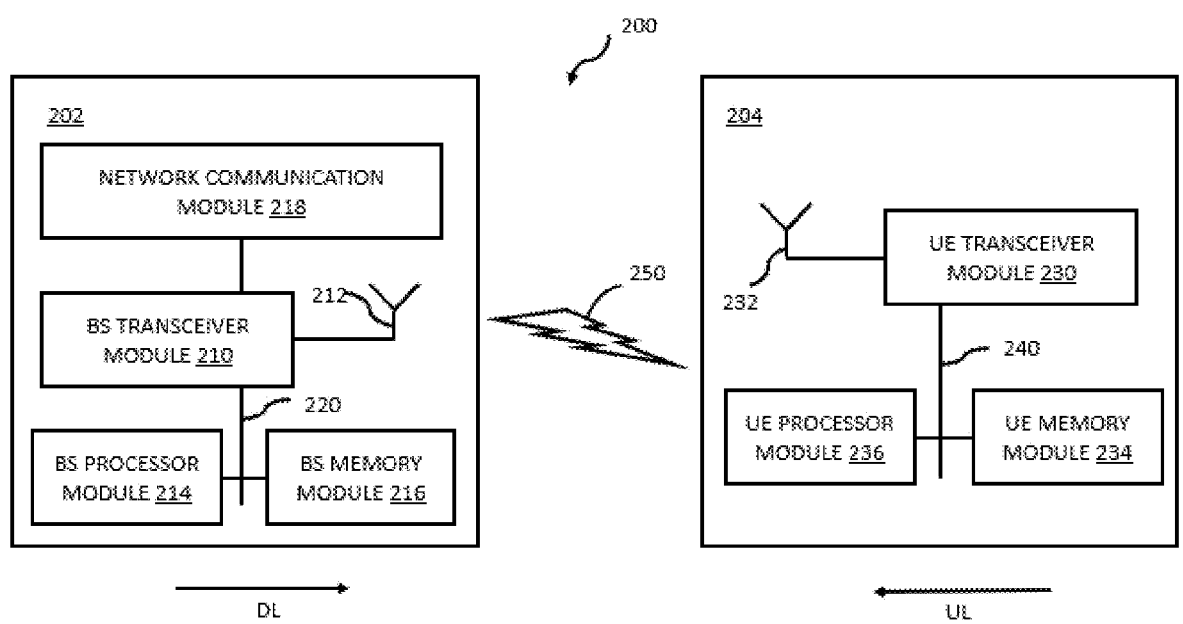
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., orthogonal frequency-division multiplexing (OFDM)/orthogonal frequency-division multiple access (OFDMA) signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Having discussed aspects of a networking environment as well as devices that can be used to implement the systems, methods and apparatuses described herein, additional details shall follow.

Large transmission delays and extensive coverage areas can have a non-negligible impact on wireless communication systems. For example, in some instances, a non-terrestrial wireless communication node can be located on a satellite. The fast movement of the satellite can lead to Doppler frequency shifting. Further, the distance of the satellite from terrestrial wireless communication devices can result in large transmission round trip times, which in turn result in large timing advance compensation during communication between the wireless communication devices and the wireless communication node. Positioning of the wireless communication node on a satellite may also result in multiple satellite beams with large beam footprints forming one satellite cell. This can result in large cell-specific differential delays, leading to undesirable increase in the length of a temporal window for random-access response (RAR) communication of a random-access channel (RACH) procedure.

In some aspects, technical solutions to the technical problems detailed above can include configuring transmission resources, e.g., RACH resources, in a satellite beam specific manner to reduce the risk of significant change in RACH procedure design. Transmission parameters, such as, for example, timing advance (TA) or scheduling offset can be configured per satellite beam to reduce the complexity of pre-compensation to account for time delays.

Figure 3:
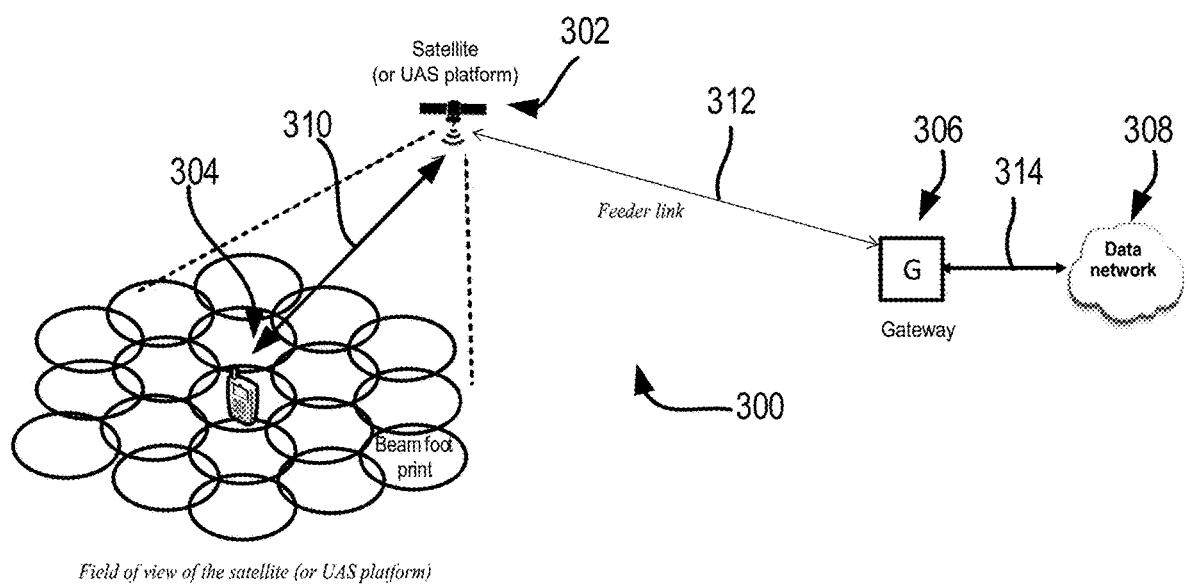
FIG. 3 shows a schematic of an example non-terrestrial communication network including at least one unmanned aerial system based wireless communication nodes, in accordance with some embodiments of the present disclosure.

FIG. 3 shows a schematic of an example non-terrestrial communication network 300 including at least one unmanned aerial system based wireless communication nodes. In particular, FIG. 3 shows a communication network 300 including a satellite or an unmanned aerial vehicle (UAV) 302, user equipment (UE) 304, a gateway 306 and a data network 308. The satellite 302 can serve as a platform for a base station, such as, for example, the BS 102 and 202 discussed above in relation to FIGS. 1 and 2, and the UE 304 can be similar to the UE 104 and 204 discussed above in relation to FIGS. 1 and 2. The UE 304 and the BS on the satellite 302 can communicate over a communication link 310, and the BS on the satellite 302 and the gateway 306 can communicate over a feeder link 312. The gateway 306 can communicate with the data network 308 over a data link 314.

Figure 4:
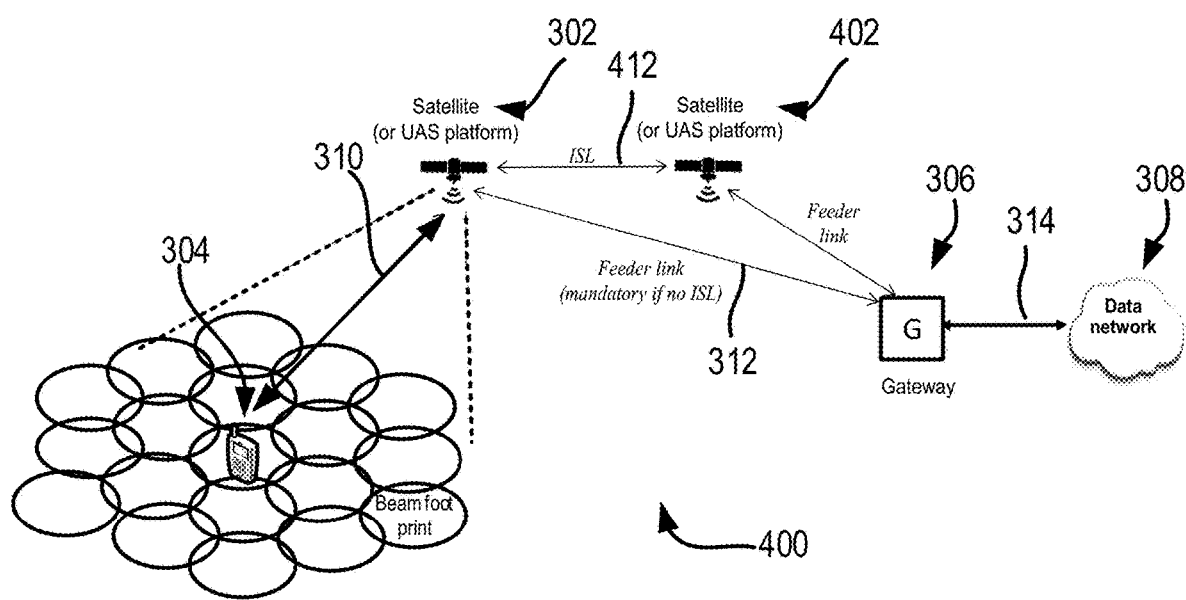
FIG. 4 shows another example non-terrestrial communication network including at least one unmanned aerial system based wireless communication nodes, in accordance with some embodiments of the present disclosure.

FIG. 4 shows another example non-terrestrial communication network 400 including at least one unmanned aerial system based wireless communication nodes. The communication network 400 shown in FIG. 4 is similar to the communication network 300 shown in FIG. 3, but include an additional satellite or UAV platform 402. FIG. 4 depicts the scenario where the communication network includes a constellation of satellites that allow communication between the UE and the gateway or data network.

The gateway can be one of several gateways that can provide connectivity between satellite 302/402 and the data network 308, which can be a public terrestrial data network. The gateways can be deployed across the satellite's targeted coverage area, which can include regional or continental coverage area. In examples where the satellite is a non-geostationary earth orbit satellite ("non-GEO satellite"), the satellite can be served successively by one or several gateways at a time. The communication network can ensure that there is the service link and the feeder link continuity is maintained between successive gateways with sufficient time duration to proceed with mobility anchoring and handover. In some examples, the UE in a cell may be served by only one gateway.

The satellite can implement either a transparent or a regenerative (with on-board processing) payload. The satellite can generate several beams over a service area that can be bounded by its field of view, which can depend on the on-board antenna characteristics and a minimum elevation angle of the satellite. The footprints of the beams on the surface of the earth can be elliptical in shape. In instances where the satellite implements transparent payload, the satellite may carry out radio filtering, frequency conversion, and amplification, thereby repeating the signals. In instances where the satellite platform implements regenerative payload, the satellite can carry out radio frequency filtering, frequency conversion, amplification, as well as demodulation/modulation, switching and/or routing, coding/modulation, etc., effectively carrying out functions, at least in part, of a base station on-board the satellite.

In instances where the communication system includes a constellation of satellites, such as for example, the communication system shown in FIG. 4, the network can include an inter-satellite link (ISL) 412. In some such instances, the satellites can implement regenerative payload. The ISL can may operate in RF or in optical frequency bands.

Table 1 below lists various types of satellites that can be used to implement the satellite/UAV 302 and 402 shown in FIGS. 3 and 4. The types of satellites and the corresponding information shown in Table 1 are only examples and are not limiting, as other types of platforms and satellites can also be utilized.

TABLE 1

| Platforms | Altitude range | Orbit | Typical beam footprint size |
| --- | --- | --- | --- |
| Low-Earth Orbit (LEO) satellite | 300-1500 km | Circular around the earth | 100-500 km |
| Medium-Earth Orbit (MEO) satellite | 7000-25000 km | | 100-500 km |
| Geostationary Earth Orbit (GEO) satellite | 35 786 km | notional station keeping position fixed in terms of elevation/azimuth | 200-1000 km |
| UAS platform (including HAPS) | 8-50 km (20 km for HAPS) | with respect to a given earth point | 5-200 km |
| High Elliptical Orbit (HEO) satellite | 400-50000 km | Elliptical around the earth | 200-1000 km |

In some embodiments, GEO satellite and UAS platforms can be used to provide continental, regional, or local service. In some embodiments, a constellation of LEO and MEO satellites can be used to provide services in both northern and southern hemispheres. In some instances, constellation of satellites can even provide global coverage including the polar regions. In some such instances, appropriate orbit inclination, ISLs and beams can be selected.

Aspect I: Enhanced RACH Procedure

This portion of the discussion relates to the use of UE estimated Timing Advance (TA) to assist RACH procedure, where the UE estimated TA can be applied to adjust the uplink transmission time at UE's side before the transmission of preamble in RACH procedure. The UE may be embodied in various types of user devices such as a mobile phone, a smart phone, a personal digital assistant (PDA), tablet, laptop computer, wearable computing device, etc., and the BS can include an evolved node B (eNB), a serving eNB, a target eNB, a femto station, a pico station, etc. In some examples, the TA may be estimated by the UE according to it's location information and satellite ephemeris information received from broadcast information or system information or RRC signaling message from the base station (BS). The following discussion particularly relates to the control of the user of the TA determined by the UE in a 4-step or a 2-step RACH procedure.

Figure 5:
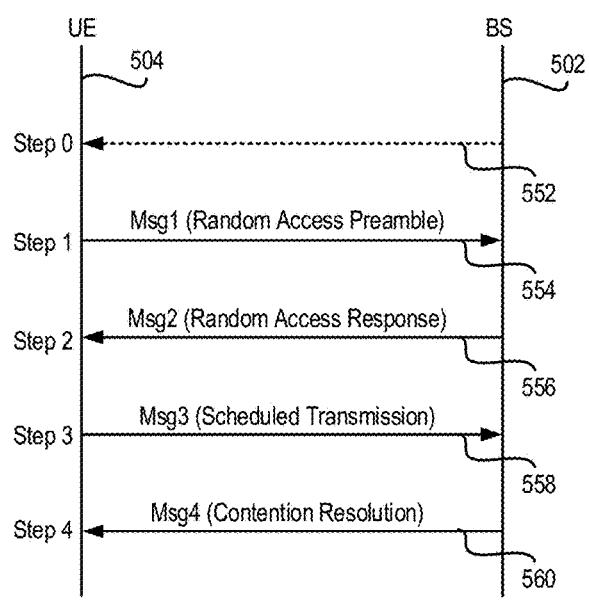
FIG. 5 shows a flow diagram of a 4 step RACH procedure, in accordance with some embodiments of the present disclosure.
Figure 6:
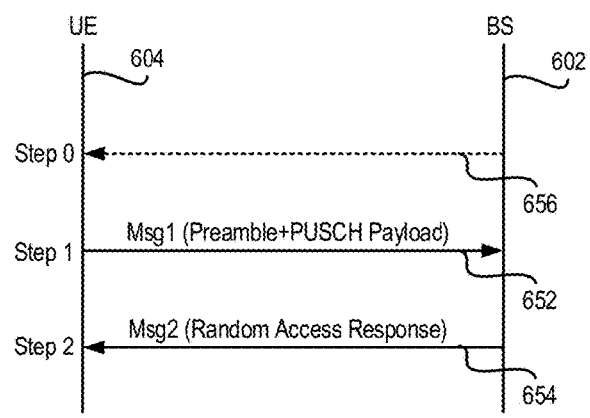
FIG. 6 shows a 2 step RACH procedure, in accordance with some embodiments of the present disclosure.

FIG. 5 shows a flow diagram of a 4-step RACH procedure, while FIG. 6 shows a 2-step RACH procedure. Referring to FIG. 5, the 4-step RACH procedure is carried out between the UE 504 and the base station (BS) 502. The UE 504 and the BS 502 can be implemented using the UEs and BSs discussed above in relation to FIGS. 1-4. FIG. 6 on the other hand shows a 2-step RACH procedure between an UE 604 and a BS 602. The UE 602 and the BS 604 can be implemented using the UEs and BSs discussed above in relation to FIGS. 1-4.

The 4-step RACH process shown in FIG. 5 can include step 1 corresponding to Msg1 (random access preamble) 554 transmitted from the UE to the BS, step 2 corresponding to Msg2 (random access response) 556 transmitted from the BS to the UE, step 3 corresponding to Msg3 (scheduled transmission) 558, and step 4 corresponding to Msg4 (contention resolution) 560. Step 0 552 can correspond to the resource configuration information broadcast by the BS.

The 2-step RACH process shown in FIG. 6 can include step 1 corresponding to Msg1 (preamble+PUSCH payload) 652 transmitted by the UE to the BS, and step 2 corresponding to Msg2 (random access response) 654 transmitted by the BS to the UE. Step 0 656 can correspond to the resource configuration information broadcast by the BS.

Referring again to FIG. 5, in step 0, the UE can receive information from the BS that can include, in part, RACH resource configuration, PDSCH (physical downlink shared channel) resource configuration, PDCCH (physical downlink control channel) resource configuration (e.g., configuration of CORSET (control resource set) and SS (synchronization signal)), PUSCH (Physical uplink shared channel) resource configuration, and PUCCH (physical uplink control channel) resource configuration. The UE can receive the resource configuration information from the BS in step 0 via BS broadcast, in system information, or RRC (radio resource control) signaling.

In a 4 step RACH procedure, the UE in step 1 sends a random access preamble, also referred to as the PRACH (physical RACH) to the BS. In step 2, the BS transmits the RAR (random access response) indicating the reception of the preamble and providing a timing-advance command adjusting the transmission timing of the device based on the timing of the received preamble in step 1. The UE can use a RA-RNTI (random access radio-network temporary identifier) to monitor the PDCCH for the RAR within the RAR window. In step 3, the UE transmits Msg3 over the UL resource indicated in UL grant included in the RAR received from the BS in step 2. In response, in step 4, the UE receives Msg4 for contention resolution. The UE and the BS can exchange Msg3 and Msg4 with the aim of resolving potential collisions due to simultaneous transmissions of the same RACH resource, e.g., preamble and RACH occasions, from multiple devices within the cell. If successful, the Msg4 also transfers the UE to a connected state.

In the 2 step RACH procedure, in step 1 the UE sends the random access preamble over the PRACH and the payload over the PUSCH (physical uplink shared channel), and in step 2, receives Msg2 within the Msg2 reception window and performs contention resolution.

The following discussion is related to various approaches to controlling the utilization of the UE estimated timing advance in the RACH procedure, such as the 4 step and 2 step RACH procedure discussed above, or any other RACH procedure implemented.

A. RACH with/without Assistance of TA Estimated by UE

In some embodiments, a UE can estimate TA before initiating RACH, and use this TA to assist RACH. For example, the UE can apply the estimated TA before the transmission of random access preamble to mitigate the large transmission delay's impact on the RACH procedure. In some embodiments, the UE can estimate the TA based on the UE location information and satellite (BS) ephemeris, or by other methods. The discussion below provides examples of the RACH procedures where TA is not pre-compensated with TA estimated by UE (RACH without TA estimated by UE) and the RACH procedures where TA is pre-compensated with TA estimated by UE (RACH with TA estimated by UE). Pre-compensating TA can mean that the UE can apply the estimated TA before transmission of the random access preamble to the BS.

1. RACH without TA Estimated by UE

In some instances, the BS can broadcast a common TA that can be received by all UEs in the cell served by the BS. The UE can receive the common TA and apply the common TA before transmission of preamble to the BS. After reception of RAR (Msg2 of the 4 step RACH) containing Random Access Preamble ID (RAPID) corresponding to the preamble transmitted or RAR (Msg2 of the 2 step RACH) containing UE ID corresponding to the UE ID included in the payload part of Msg1, the UE can adjust the TA with the TA indicator included in the corresponding RAR. In such instances, because the common TA as well as the TA indicator included in the RAR is configured by the BS, both the BS and the UE are aware of the UE specific TA. Both 4-step RACH and 2-step RACH can be used in the case TA estimated by the UE is not used for assisting the RACH procedure as mentioned above.

2. RACH with TA Estimated by UE

The approaches for utilizing the TA estimated by the UE can be described with reference to the type of RACH utilized by the UE.

a. 4 Step RACH

The utilization of the TA estimated by the UE in the RACH procedure can be implemented in the various steps that make up the RACH procedure.

For example, in step 1, the UE can estimate the TA according assisted information available and apply the estimated TA before the transmission of the preamble to the BS. The assistance information can include the UE location information and the ephemeris of satellite, using which the UE can derive an approximate UE specific TA.

In step 2, the UE can receive Msg2, which can include the RNTI corresponding to the preamble transmitted. The UE can correct the estimated TA according to the TA indicator included in the Msg2. It should be noted that at this time in the RACH procedure, the BS is not aware the UE estimated TA since the TA compensated by UE is not yet indicated to the BS.

In step 3, as mentioned above, the BS is not yet aware of the UE estimated TA. In order to avoid invalid scheduling of the Msg3 transmission to the BS, the UE can take any one or more of the following approaches.

In one approach, the BS can always schedule the UE transmission of the Msg3 assuming maximum differential delay within the cell. In this manner, the Msg3 transmitted by the UE can be scheduled by the UL grant provided in the RAR in Msg2. The UE can include the estimated TA in the Msg3 transmitted to the BS. After the BS receives the Msg3 from the UE, both the UE and the BS cab be aware of the UE estimated TA.

In another approach, the BS can schedule multiple $k_2$ values in the UL grant included in the RAR. For example, if a UE receives a PDSCH with a RAR message ending in slot n for a corresponding PRACH transmission from the UE, the UE transmits the PUSCH in slot $n+k_2+\Delta$, where $k_2$ is jointly determined by the row index included in the RAR UL grant and subcarrier spacing (SCS), and $\Delta$ is determined by the SCS used. If multiple $k_2$ values are included in the RAR, the UE estimated TA can be based on the exact TA to select the appropriate $k_2$ for the transmission of Msg3. Thus, the BS can derive the UE estimated TA according to the reception time of Msg3.

In one approach, multiple $k_2$ values can be provided based on multiple time domain resource index in the RAR UL grant. In another approach, a $k_2$ index can be provided in RAR UL grant, where each $k_2$ index is mapped to a k2 list. The mapping between the $k_2$ index and the $k_2$ list can be predefined in the specification or configured by the BS, where the mapping relationship can be broadcasted or delivered by system information or RRC signaling. In some examples, different $k_2$ lists can be configured for different SCS or/and different round trip delays (RTD). The UE can select a $k_2$ list according to the k2 index included in RAR, and/or SCS and/or RTD.

In step 4 of the 4 step RACH procedure, the UE can receive the Msg4 for contention resolution.

b. 2 Step RACH

The utilization of the TA estimated by the UE in the 2 step RACH procedure can be implemented in the various steps that make up the 2 step RACH procedure.

For example, in step 1, the UE applies a TA estimated by itself before transmission of the preamble. The UE can transmits the payload on the PUSCH that is mapped to the preamble selected, where the estimated TA can be indicated by parameter included in the payload.

In one approach, the UE estimated TA value can be included in the payload of Msg1. In another approach, the "N" least significant bits (LSBs) of the SFN (system frame number) and the slot index of the time domain resource in which the preamble is transmitted can be included in the payload of Msg1 to indicate the UE estimated TA. In yet another approach, an absolute time value at which the preamble is transmitted can be included in the payload of Msg1. In yet another approach, a new TA MAC CE (MAC control element) can be used to deliver the UE estimated TA value.

In step 2, the UE receives the RAR within the RAR window. After successful contention resolution the UE can calibrate the TA according to the TA indicator included in the RAR received from the BS. Since the TA estimated by UE side can be derived by related information included in the payload, together with the additional TA estimated by reception of corresponding preamble, the BS can derive the exact UE specific TA, and schedules UE with a correct TA.

In some cases, there could be and additional delay due to the feeder link between the satellite and the ground station (e.g., delay associated with the feeder link 312 shown in FIGS. 3 and 4). In some such cases, the UE may utilize additional information to account for the additional delay in estimating the TA. The feeder link between satellite and the gateway on the ground is predictive thus a mapping table which contains the delay on the feeder link with respect to the satellite position or time can be stored at the UE side in advance. In this way, UE will calculate the delay in the service link and add it to the feeder link delay which is found from the mapping table to form the total propagation delay. For GEO transparent case, the satellite is relatively statistic to the gateway on the ground, thus the delay in the feeder link is actually fixed. A mapping table which contains the delay on the feeder link with respect to satellite ID or satellite position stored in UE side can be quite helpful for propagation delay calculation. The mapping table can be broadcasted, or pre-defined. According to the mapping table, the UE can select a suitable offset based on the satellite it is connected to and accordingly adjust the estimated TA.

B. Configuration of RACH Resources

As discussed above, the UE can receive RACH resources configuration information in step 0, prior to the transmission of the preamble to the BS. The UE can receive RACH resources configuration form the BS where the RACH resources can include separate RACH resource pools configured for RACH with and without assistance of UE estimated TA. In some embodiments, the RACH resource pool may include at least one of the following resources: the preamble transmission resource, the payload transmission resource, the mapping between preamble and payload transmission resource, the configuration of Random Response window, the parameters related to preamble transmission control, the parameters related to payload transmission control, the selection criteria of normal uplink (NUL) and supplementary uplink (SUL), the selection criteria of 2 step RACH and 4 step RACH, and the SSB selection criteria, e.g. RSRP (reference signal receiving power) threshold.

For example, from the above list of resources, the preamble transmission resource can include at least one of the following: the location of preamble transmission resource in time domain, the location of preamble transmission resource in frequency domain, and the location of preamble transmission resource in code domain, which, in turn, can include at least one of the following: a preamble index, a preamble format, a PRACH root sequence index, zeroCorrelationZoneConfig parameter, restrictedSetConfig, which determines the type of restricted sets supported for the different preamble formats, the mapping between preamble and SSBs (Synchronization Signals/PBCH Blocks), the mapping between RACH Occasions (RO) and SSBs, and grouping of preambles. The PRACH transmission occasion/RACH transmission occasion (RO) refers to the location of preamble transmission resource in time and frequency domain.

From the above list of resources, the payload transmission resource can include at least one of the following: the location of payload transmission resource in time domain, the location of payload transmission resource in frequency domain, the location of payload transmission resource in code domain (e.g. Orthogonal code, non-Orthogonal code, or some other code which will be used in physical layer. For simplicity, the code can be referred to as "payload transmission code"), and the bandwidth/PRB used for payload transmission. The payload transmission occasion can refer to the location of payload transmission resource in time and frequency domain. The "payload transmission code" can be used in NOMA (non-orthogonal multiple access) or MUSA (multi-user shared access) operation to provide better performance in case the time/frequency resource is shared by multiple UE.

From the above list of resources, the mapping between preamble and payload transmission resource, the following aspects can be incorporated in the mapping configuration. The preamble transmission resources located in different ROs can be mapped to the same payload transmission occasion with different payload transmission code. Different preambles within one RO can be mapped to different payload transmission occasions (with the same or different payload transmission code). Multiple UE using different preambles can mapped the same payload transmission resources (i.e. the same payload transmission code within the same payload transmission occasion). One preamble resources (combination of preamble+RO) can be mapped to multiple payload transmission code within one payload transmission occasion to enable the multi-layer data transmission (e.g. MIMO). The timing offset between preamble transmission resources and payload transmission resources can be different for different preamble transmission resources (e.g. the same or next time slot). Any combination of these aspects can be incorporated in the mapping configuration.

From the above resource list, the configuration of Random Response window can include at least one of the following: the length of RAR window, the start of RAR window, e.g. offset to be used to delay the start of RAR window. Any combination of these aspects can be incorporated in the Random Response window configuration.

From the above list of resources, the parameters related to preamble transmission control can include at least one of the following: target received power of preamble at BS's side, maximum allowable transmission time of preamble, and the power ramping step of preamble. Any combination of these parameters can be included.

From the above list of resources, the parameters related to payload transmission control can include target received power of payload at BS's side, maximum allowable transmission time of payload, the power ramping step of payload, and the power offset between preamble and payload. Any combination of these parameters can be included.

The configuration of the RACH resources discussed above can be delivered to the UE in at least one of the following approaches: broadcasted in broadcast information, delivered in system information, or signaled by RRC signaling.

C. Indication to the UE of the Use of UE Estimated TA in RACH

In some embodiments, the UE may have to be informed of the use of the UE estimated TA in the RACH procedure. The UE can be informed of the use of the UE estimated TA in any one or more of the approaches discussed below.

In one approach, the indication to the UE of the use of the UE estimated TA in the RACH can be implicit in the configuration of RACH resource pool. For example, if a dedicated RACH resource pool is configured for RACH with assistance of UE estimated TA, then for a UE with the ability to estimate TA by itself, e.g. derive the TA based on the UE location information and the satellite ephemeris, the UE can first try to initiate RACH with assistance of TA estimated by selecting RACH resource from the corresponding resource pool. In instances where the UE estimated TA is not available, e.g. the UE location information is not available or the estimated TA might not satisfy the accuracy requirement, the UE can initiate the RACH procedure without assistance of TA estimated by UE by selecting the RACH resource from RACH resource pool configured for RACH without assistance of UE estimated TA.

In another approach, the UE can receive an indication from the B S regarding the use of the UE estimated TA in the RACH procedure. For example, a one-bit indication can be sent from the BS to indicate if UE estimated TA will be utilized for RACH. For example, a "1" can indicate the UE estimated TA can be used for assisting RACH if the UE estimated TA is available at UE's side, and a "0" can indicate that the UE estimated TA will not be used for assisting RACH regardless of the availability of the UE estimated TA. In another example, this indication can be configured per RACH resource pool to indicate whether the RACH resource pool can be used for RACH with assistance of UE estimated TA. The indication can be included in at least one of the following methods: in the broadcast information or in system information, or in RRC signaling (e.g. RRCReconfiguration message).

In yet another approach, an indicator from the BS can indicate the type of RACH procedure to the employed. For example, an indicator can be used to enable UE estimated TA for use in RACH. If the indicator is included in the broadcast information or system information, or in RRC signaling (e.g. RRCReconfiguration message), then the UE estimated TA will be used for RACH if available at UE's side. If absent then the absence can indicate to the UE to that the UE estimated TA is not being used in the RACH. In another example, the indicator can be used to enable RACH without UE estimated TA. If the indicator is included in broadcast information or system information, or in RRC signaling (e.g. RRCReconfiguration message), then RACH without location information can be supported. If absent then the absence can indicate that the use of the UE estimated TA in the RACH. This can also indicate in cases where UE estimated TA is not available to the UE, the UE cannot get access to the BS.

In yet another approach, the BS can control whether a general RACH procedure is supported. For example, a two-bit indication can be used to indicate which kind of RACH procedure is supported. For example a "00" can indicate that both RACH with UE estimated TA and RACH without UE estimated can be supported. A "01" can indicate that only RACH with UE estimated TA is supported. A "10" can indicate that only RACH without UE estimated TA is supported, and a "11" can be reserved. The above example mapping between the bits and the corresponding indication is only an example and other bit combinations and encodings can be utilized to convey the same information.

At least one of the approaches discussed above can be configured per RACH resource pool, or per cell. In case the configuration is per RACH resource pool, if indication indicated certain RACH resource pool can be used for RACH with assistance of UE estimated TA, then for UE with the ability to estimate TA by itself, e.g. derive based on UE location information and satellite ephemeris, UE can first try to initiate RACH with assistance of TA estimated by selecting RACH resource from the corresponding resource pool. In instances where the UE estimated TA is not available, e.g. the UE location information is not available or the estimated TA might not satisfy the accuracy requirement, the UE can initiate RACH without assistance of TA estimated by UE by selecting the RACH resource from corresponding RACH resource pool.

In yet another approach, the indication of the utilization of the UE estimated TA can be implicitly indicated. For example, if an offset to delay the start of the RAR window is separately configured for the UE without/with UE estimated TA, then it implies both RACH with/without location information will be supported. In the instances where the UE estimated TA is available, the UE can use the UE estimated TA to assist RACH. If only one offset is configured, then it implies only the corresponding RACH (either RACH with UE estimated TA or RACH without UE estimated TA) will be allowed. In this example, the offset can be included in broadcast information or system information, or in RRC signaling (e.g. RRCReconfiguration message).

Both 4 step RACH and 2 step RACH or any other RACH procedure can be supported regardless of whether UE estimated TA is used for RACH or not. All alternatives mentioned above can be used together with any other principles defined for selection between 2 step RACH, 4 step RACH or other RACH type. For example, the UE first determines whether UE estimated TA will be used in RACH according to the alternatives given above, e.g. by selecting the corresponding RACH resource pool, then select RACH type (2 step RACH, 4 step RACH or other RACH type) according to the criterion defined in specification. Or in another example for RACH with assistance of UE estimated TA only 2-step RACH or 4-step RACH can be supported.

D. RAR Reception Window Control Based on UE Estimated TA

The start and end of the RAR window may be configured based on whether the UE estimated TA is being used in the RACH.

1. Start of RAR window a. RACH without UE Estimated TA

In order to compensate for the large transmission delay, a configurable offset can be indicated to the UE to delay the start of the RAR window. The offset can be broadcasted, included in system information or indicated by RRC signaling. This is can be applied for 4 step RACH, 2 step RACH or other RACH procedure in case no UE estimated TA is used in RACH.

b. RACH with UE Estimated TA

In first approach, the start of the RAR window can be configured by the UE itself. In another approach, a configurable offset can be used to delay the start of the RAR window. The offset can be the same as the offset used for RACH without UE estimated TA or a separate offset can be used for RACH with UE Estimated TA. This offset can be broadcasted, included in system information or indicated by RRC signaling. The above approaches can be applied for 4 step RACH, 2 step RACH or any other RACH procedure in case UE estimated TA is used in RACH.

2. Extended RAR Window a. RACH without UE Estimated TA

The maximum RAR window length is 10 ms, in case differential delay is very large, the RAR window would have to be extended.

b. RACH with UE Estimated TA

Depending on to what extent the TA is compensated, if after compensation from UE's side, the differential delay does not exceed 10 ms, then the RAR window may not have to be extended, otherwise the window would have to be extended.

In case RAR window is extended, the RAR window for different ROs might overlap. In order to differentiate RARs for different ROs, following approaches can be considered. For example, in one approach, an SFN index can be included in the RAR. The LSB of the SFN of the frame in which the preamble is transmitted can be included in the RAR (the SFN index can be obtained as SFN_RO+mod ((SFN_preamble-SFN_RO)/2), where SFN_RO is the SFN index where RO is located, and SFN_preamble is the SFN index where preamble is received at BS's side). The LSB can be either included in the subheader of the MAC subPDU or in the RAR payload. Delaying the start of RAR window and extending RAR window length can be configured to use together or separately.

E. Differentiation Between RAR Intended for RACH with/without UE Estimated TA

In some embodiments, RACH with and without UE estimated TA can be supported simultaneously by the BS. Since the RAR content and structure might be different for RACH with/without UE estimated TA, and there might be overlapping between the corresponding RAR windows, there is a need to differentiate the RARs for RACH with/without UE estimated TA. In some instances, this can affect the step 2 of the RACH procedure.

In one approach, separated CORESET and/or SS can be configured for RACH with/without UE estimated TA. In another approach, different RA-RNTI can be used to differentiate RAR for RACH with/without UE estimated TA. For example one configurable offset can be included in the formula of RA-RNTI calculation: RA-RNTI=1+s_id+14× t_id+14×80×f_id+14×80×8+14×80×8×1×ul_carrier_id+offset. Where s_id is the index of the first OFDM symbol of the specified PRACH, t_id is the index of the first slot of the specified PRACH in a system frame, f_id is the index of the specified PRACH in the frequency domain, and ul_carrier_id is the UL carrier used for Msg1 transmission (0 for NUL carrier, and 1 for SUL carrier). The offset can be configured by the BS, and can be adjusted according to separation of consecutive ROs and the maximum differential delay within the communication network. Or in another approach, the RA-RNTI can be calculated according to following formula: The resource pool identifier may be introduced as part of the RA-RNTI formula:

$$RA\text{-}RNTI = 1 + s\_id + 14 \times t\_id + 14 \times 80 \times f\_id +$$
$$14 \times 80 \times 8 \times r\_id + 14 \times 80 \times 8 \times 1 \times N\_r\_id \times ul\_carrier\_id,$$

where s_id is the index of the first OFDM symbol of the specified PRACH, t_id is the index of the first slot of the specified PRACH in a system frame, f_id is the index of the specified PRACH in the frequency domain, r_id is the index of the selected resource pool (0≤r_id<N_r_id), N_r_id is the total RA resource pool configured and ul_carrier_id is the UL carrier used for Msg1 transmission (0 for NUL carrier, and 1 for SUL carrier).
Or in another approach, the RA-RNTI can be calculated according to following formula:

$$RA\text{-}RNTI =$$
$$1 + s\_id + 14 \times t\_id + 14 \times 80 \times F\_id + 14 \times 80 \times [\max(F\_id) - 1] \times f\_id +$$
$$14 \times 80 \times [\max(F\_id) - 1] \times 8 \times ul\_carrier\_id,$$

where s_id is the index of the first OFDM symbol of the specified PRACH, t_id is the index of the first slot of the specified PRACH in a system frame, f_id is the index of the specified PRACH in the frequency domain, and ul_carrier_id is the UL carrier used for Msg1 transmission (0 for NUL carrier, and 1 for SUL carrier). The F_id (0≤F_id<max (F_id) can be achieved by one of the following approaches.
  Approach 1: The frame related parameter is the "N" least significant bits of the system frame index, in this case the max max(F_id) equals $2^N$.
  Approach 2: The frame related parameter is the index of the system frame, the max(F_id) equals the maximum number of system frame index.
  Approach 3: The F_id is obtained as (the system frame index) mod (ceil (RAR window_length divided by system_frame_length)). If the ceil(RAR_window_length divided by system_frame_length) equals N, then the max(F_id) equals N. Here, the ceil( ) represents the ceiling function that maps number "x" to the least integer greater than or equal to "x". And the mod( ) represents the modulo function that finds the remainder after division of one number by another.
Different RA-RNTI formula can be used to for non-terrestrial network with different round trip delays or with different satellite types. For example, RA-RNTI formula as specified in technical specs 38321 can be used for LEO case, while the formula as specified in Approach 3 can be used for GEO case.

In another approach, preamble grouping can be utilized. In case the preamble is divided into different groups for RACH with/without UE estimated TA, the RAPID included in the RAR can be used to differentiate the above two RACH types.
In yet another approach, an indication can be included in the RAR. For example, an indication can be included in the sub-header or in the RAR payload to differentiate between RAR for RACH with/without UE estimated TA. For example, a one-bit type indicator is used, "1" means this is RAR for RACH with assistance of UE estimated TA, "0" means this is RAR for RACH without assistance of UE estimated TA, or vice versa.
In yet another approach, an indication can be implicit in the type of RACH procedure used. For example, RACH with UE estimated TA may always adopt a 2 step RACH while RACH without UE estimated TA may always adopt a 4 step RACH.
Any combination of the above discussed approaches can be utilized in differentiating between RAR intended for RACH with and/or without UE estimated TA. Furthermore, different combination of above approaches (including combination of the same approach) can be considered when 2 step RACH, 4 step RACH or other RACH procedure is supported simultaneously for RACH with and/or without UE estimated TA. For example, separated Control Resource Set (CORESET) and/or Search Space (SS) can be configured for 2 step RACH with UE estimated TA, 2 step RACH without UE estimated TA, 4 step RACH with UE estimated TA, and 4 step RACH without UE estimated TA. For example, separated CORESET and/or SS can be configured for 2 step RACH and 4 step RACH, and preamble grouping can be further used for differentiation between RACH with and without UE estimated TA. Or in another example, separated CORESET and/or SS can be configured for 2 step RACH/4 step RACH and RAR indication can be further used for differentiation between RACH with and without UE estimated TA.

F. Differentiating RACH with/without UE Estimated TA at the BS
Several approaches can be used by the BS in differentiating whether RACH with or without UE estimated TA is being employed. In one approach, preamble grouping can be used, where the preamble can be divided into separated groups for RACH with/without UE estimated TA. For example, group 1 is configured for RACH with UE estimated TA, group 2 is configured for RACH without UE estimated TA, then for UE can initiate RACH with UE estimated TA or RACH without UE estimated TA, by selecting preamble from the corresponding group.
In another approach, the RACH resource division in time and/or frequency domain can be used. For example separated RACH resource pool without overlapping in frequency domain can be configured. Then BS can derive the received Msg1(Msg1 of 4-step RACH or Msg1 of 2-step RACH) is for RACH with or without UE estimated TA based on the frequency resource the Msg1 is received. Or in another approach, RO division in time domain can be used to differentiate RACH with UE estimated TA and RACH without UE estimated TA from BS's side. BS can derive the received Msg1(Msg1 of 4-step RACH or Msg1 of 2-step RACH) is for RACH with or without UE estimated TA based on the RO where the Msg1 is detected. Or in yet another approach, the RACH resource in both frequency domain and time domain can be used, e.g. separated RACH resource pool is configured for RACH with or without UE estimated TA, the BS can derive the RACH category (RACH with or without UE estimated TA) according the RACH resource pool is utilized for transmission of preamble of Msg1(Msg1 of 4-step RACH or Msg1 of 2-step RACH).

In yet another approach, frequency hopping of preamble transmission can be utilized. For example, different frequency can be used for RACH with/without UE estimated TA. The BS can, according to the frequency on which preamble of Msg1(Msg1 of 4-step RACH or Msg1 of 2-step RACH) is received, derive whether UE estimated TA is used for RACH or not.

In yet another approach, the preamble format can be utilized to differentiate RACH with UE estimated TA and without UE estimated TA at BS's side. For example, different preamble format can be configured separately for RACH with and without assistance of UE estimated TA, then BS, based on the preamble format to derive whether the received preamble is for RACH with or without assistance of UE estimated TA.

Above approaches used to differentiate RACH with or without assistance of UE estimated TA at BS's side can be used when both 2 step RACH and/or 4 step RACH is supported for RACH with/without assistance of UE estimated TA.

In yet another approach, Indication in PUSCH payload of Msg1 in the 2 step RACH can be used. For example, for 2-step RACH, a one-bit type indicator can be used to indicate whether the RACH is with/without UE estimated TA. For example, if the value of indicator is set as '1' then UE estimated TA is used in RACH, and the information indicating the TA value estimated by UE is included in the payload of Msg1. Otherwise UE estimated TA is not used in RACH. Other encoding formats can also be used.

Different combination of above approaches (including combination of the same approach) can be considered when 2 step RACH, 4 step RACH or other RACH procedure is supported simultaneously for RACH with/without UE estimated TA. For example, preambles can be divided into separated groups for 2 step RACH with UE estimated TA, 2 step RACH without UE estimated TA, 4 step RACH with UE estimated TA, and 4 step RACH without UE estimated TA. In another example 2-step RACH and 4-step RACH can be separated by different preamble group while RACH with/without UE estimated TA can be differentiated by frequency hopping of preamble. In yet another example, separated RO can be configured for 2 step RACH and 4 step RACH, in addition RACH with/without UE estimated TA can be differentiated by preamble grouping.

For the above discussed approaches, the mapping between RACH resource, e.g., RACH resource in time and/or frequency and/or code domain, and the RACH type, e.g., 2 step RACH/4 step RACH and/or RACH with/without UE estimated TA can be delivered to UE in at least one of the following methods: broadcasted in broadcast information, delivered in system information, or signaled by RRC signaling.

G. Improving RACH Capacity of the Satellite

In order to improve the RACH capacity within a satellite coverage, frequency domain division can be used, where each satellite beam, there could be several cells located in different non-overlapped frequency bands.

Aspect II: 2-Step CFRA

To allow more efficient state transition or hand over, one solution can be considered is 2-step Contention Free RACH (CFRA). Although in this application the 2-step CFRA is described in NTN scenario, the usage of 2-step CFRA is not limited in NTN. It can also be used for other scenarios, e.g., terrestrial communication systems.

A. Procedures for 2-Step CFRA

Similar as 2-step CBRA, the basic procedure of 2-step CFRA can include the following two steps:

Step 1: UE transmit Msg1 with dedicated preamble and dedicated PUSCH resource configured by BS.

Step 2: UE receive the response by monitoring the PDCCH addressed to C-RNTI.

B. How to determine the RA type/RA resource in case 2-step CFRA is configured

Once the RACH procedure is initiated, if the 2-step CFRA resource is configured, the following approaches can be considered to determine the RACH type on UE's side.

Approach 1: If 2-step CFRA is configured (or If 2-step CFRA is configured in the current UL BWP), the UE should select 2-step RACH (or 2-step CFRA) in initialization phase of RACH procedure.

Approach 2: UE can determine whether the 2-step CFRA (or 2-step RACH) is applicable based on the pre-configured RSRP threshold. If 2-step CFRA (or 2-step RACH) is applicable based on the RSRP threshold (e.g. the measurement result is above or "equal or above" the pre-configured RSRP threshold), the UE can select 2-step RACH; otherwise, the UE can select 4-step RACH.

For Approaches 2 mentioned above, the RSRP threshold can be either RSRP threshold for cell (or BWP) or RSRP threshold for SSB or CSI-RS.

In case the SSB/CSI-RS level RSRP threshold is used for RA type selection, at least of the following two conditions can be considered:

Cond-1: the 2-step RACH will be considered as applicable in case any of RSRP of the SSB or CSI-RS is larger (or "equal or larger") than the pre-configured RSRP threshold.

Cond-2: the 2-step CFRA (or 4-step CFRA) will be considered as applicable in case any of RSRP of the SSB or CSI-RS with 2-step CFRA (or 4-step RACH) resource is larger (or "equal or larger") than the pre-configured RSRP threshold.

In case the cell (or BWP) level RSRP threshold is used for RA type selection, following conditions can be considered:

Cond-1: the 2-step RACH will be considered as applicable in case the RSRP of the cell (or BWP) is larger (or "equal or larger") than the pre-configured RSRP threshold. In some examples, the description above on selection based on RSRP threshold is applicable to all the RSRP related to RA type selection.

In some embodiments, once 2-step RACH (or 4-step RACH) is selected, the UE can do the further selection between 2-step CFRA and 2-step CBRA (or 4-step CFRA and 4-step CBRA) when doing the resource selection.

In the RACH resource selection, if no qualified SSB and/or CSI-RS with 2-step CFRA resource can be detected, the following approaches can be considered to determine the RACH type on UE side.

Approach 1: For each Msg1 (or RACH) transmission attempt, if no qualified SSB and/or CSI-RS with 2-step CFRA resource can be detected, the UE can select a 4-step CBRA (or a 4-step RACH).

Approach 2: For each Msg1 (or RACH) transmission attempt, if no qualified SSB and/or CSI-RS with a 2-step CFRA resource can be detected, if a 2-step CBRA is configured, the UE can determine whether the 2-step CBRA is applicable based on a pre-configured RSRP threshold. If a 2-step CBRA is applicable, then the UE can select a 2-step CBRA. Otherwise, the UE can select a 4-step CBRA (or a 4-step RACH).

In some embodiment, for above Approaches ½ mentioned in, once a 4-step CBRA (or a 4-step RACH) is selected, the UE can continue using a 4-step CBRA (or a 4-step RACH) in the subsequent RACH retransmission attempt in the RACH procedure.

In some embodiments, for Approach 2, once the CBRA is selected, the UE can continue using the CBRA in the subsequent RACH retransmission attempt in the RACH procedure.

In some embodiments, after N times failure has been detected for a 2-step CFRA, then the UE can select the 4-step CBRA, and continue using the 4-step CBRA in the subsequent RACH retransmission attempt in the RACH procedure.

In some embodiments, for Approaches ½, if the 4-step RACH is selected, and if the 4-step CFRA is configured, if any qualified SSB and/or CSI-RS with the 4-step CFRA resource can be found, the UE can select the 4-step CFRA, otherwise, the UE can select the 4-step CBRA.

In some embodiments, for Approaches ½, if UE first selects the 2-step CBRA and selects preambles within one preamble group to perform the 2-step CBRA, and if UE then falls-back to the 4-step CBRA, the UE can select the preamble of the same preamble group selected in the 2-step CBRA to perform the 4-step CBRA.

C. How to configure the dedicated 2-step CFRA resources

Two resource pools can be considered for the 2-step CBRA:

Resource pool for preamble resource.

For the preamble resource pool, the 2-step RACH can either share the resource pool with the 4-step RACH or have a separate resource pool for the 2-step RACH specifically Resource pool for PUSCH resource.

A mapping rule defined in RAN1 can be used to map the PUSCH resource within the resource pool to the preamble in the preamble resource pool In the 4-step RACH, a dedicated RA resource pool can be configured for CFRA, and if the dedicated RA resource pool is not configured, then the UE can use the common RA resource pool configured for the 2-step CBRA. In some examples, the common resource pool can be configured by the RACH-ConfigCommon IE. For the 2-step CFRA, since there will be two separate resource pool (i.e., the preamble resource pool and the PUSCH resource pool), then the following approaches can be considered for configuring the 2-step CFRA resource:

Approach 1: Both the dedicated preamble resource pool and the dedicated PUSCH resource pool are configured in the dedicated signaling for CFRA, in which case the 2-step CFRA resource are reserved from the two dedicated resource pool.

Approach 2: None of the dedicated preamble resource pool nor the dedicated PUSCH resource pool is configured, in which case the the CFRA is resourced from the common resource pool, which is configured in the common configuration for the serving cell.

Approach 3: Only the dedicated PUSCH resource pool is configured, in which case the preamble resource is reserved from the common resource pool but the PUSCH resource is reserved from the dedicated resource pool.

Approach 4: Only the dedicated preamble resource pool is configured, in which case the preamble resource is reserved from the dedicated resource pool but the PUSCH resource is reserved from the common resource pool.

For the configuration of the PUSCH resource for the 2-step CFRA, the following approaches can be considered.

Approach 1: PRACH resource pool+PUSCH resource pool+(preamble reserved) for each SSB Or (RO+preamble reserved) for each CSI-RS.

In Approach 1, one can configure the PRU (PUSCH resource unit) for all the preambles reserved for 2-step CFRA, with the same mapping rule defined in RAN1. And the PRU can be reserved by reserving the corresponding preamble. For example, one can indicate the number of preambles reserved for the 2-step CFRA in each RO, and configure the PRU for these ROs. Then one can configure the dedicated preambles for each SSB selected (or both RO and preamble for each CSI-RS configured), with the preamble configured, the UE can determine the PRU based on the same mapping rule. In addition, since this is configured in one UE specifically way, it's PUSCH resource pool can be different for different UEs, and the resource in the pool can still be used for other purpose if it is not reserved for this UE. In some embodiments, the total number of preambles reserved for the 2-step CFRA within each RO (or the total number of preambles reserved for the 2-step CFRA linked to each SSB within each RO) can be configured to UE through RRC signaling.

Approach 2: PRACH resource pool+(preamble reserved+PRU reserved) for each SSB or (RO+preamble reserved+PRU reserved) for each CSI-RS In Approach 2, the PRU for SSB or CSI-RS (and/or for each preamble) can be configured explicitly and separately.

Approach 3: PRACH resource pool+dedicated configuration of PRU+(preamble reserved) for each SSB Or (RO+preamble reserved) for each CSI-RS Compared to Approach 2, a dedicated configuration of PRU is given for all the SSB/CSI-RS. With the dedicated configuration of PRU, each RO (RACH occasion) will be mapped to one PRU (e.g. all the preambles within one RO will be mapped to the same PRU). With the dedicated configuration of PRU, different mapping rules can be used for CONNECTED mode and IDLE/INACTIVE mode.

Approach 4: PRACH resource pool+common configuration of PRU+(preamble reserved+dedicated PRU configuration) for each SSB Or (RO+preamble reserved+dedicated PRU configuration) for each CSI-RS.

In Approach 4, the UE determines the PRU for each SSB/CSI-RS based on both the common configuration and dedicated configuration. For example, the time domain configuration and/or frequency domain configuration are given in the common configuration of PRU, but the code domain configuration and/or power domain configuration are given in the dedicated PRU configuration.

D. RA Prioritization for 2-Step RACH

For the configuration of RA prioritization, the following two approaches can be considered:

Approach 1: A common set of RACH Prioritization parameters, which are applicable to both 2-step RACH and 4-step RACH.

Approach 2: Separate RACH Prioritization parameters, which are applicable to the 2-step RACH and the 4-step RACH accordingly. For Approach 2, in some embodiments, the absence of IE in the structure of RACH Prioritization parameters for the 2-step RACH means the same value configured for the 4-step RACH will be used for the 2-step RACH as well.

The Approaches ½ can be used in a combined way, in which some parameters will be common for the 2-step RACH and the 4-step RACH, and other parameters can be configured separately for the 2-step RACH and the 4-step RACH.

For the RACH Prioritization parameters for the 2-step RACH, at least one of the following parameters can be considered: powerRampingStepHighPriority for preamble, powerRampingStepHighPriority for PUSCH, scalingFactorBI for 2-step RACH.

E. RA Type Selection in the Beam Failure Recovery

For the RACH triggered by beam failure recovery, if the 4-step CFRA resource for beam failure recovery request have been explicitly provided by RRC, the UE should select the 4-step RACH. For the RACH triggered by beam failure recovery, if the 4-step CFRA resource for beam failure recovery request have not been provided by RRC, and if both the 2-step CBRA resource and the 4-step CBRA resource are configured, the UE can determine whether the 2-step CBRA is applicable based on a pre-configured RSRP threshold. If the 2-step CBRA is applicable, then the UE should select the 2-step CBRA. Otherwise, the UE should select the 4-step CBRA (or 4-step RACH).

F. Handling of Hybrid Automatic Repeat Request (HARQ)

For the UL grant for Msg1 payload transmission (or Msg1 transmission), the UE can consider the NDI for the HARQ process linked to the UL grant as toggled, even the time-AlignmentTimer is not running.

Aspect III: Resource Configuration

Upon power on, the UE can perform cell search to acquire time/frequency synchronization to a cell and try to decode master information block (MIB), which includes information for decoding SIB1 (System Information Block 1). After successfully decoding the MIB, the UE can try to decode the SIB1 to obtain the necessary information for (re-) selection/ Access to cell as well as other functions. The SIB1, as well as other system information, is scheduled by DCI (Downlink Control Information) 1-0 with CRC (cyclic redundancy check) scrambled with SI-RNTI (System Information-RNTI), which can have a fixed value of FFFF. Information included in SIB1 and MIB can be cell specific. In instances where one satellite cell includes multiple satellite beams, the transmission resource and parameters can be configured per satellite beam or per groups of satellite beams, which can be done by broadcasting different system information in each satellite beam or in each group of satellite beams.

A. Indication of Use of Per Satellite Beam Resource Configuration

In one aspect, an indicator can be included in the system information (e.g. MIB, SIB1 or other system information) to indicate that the transmission resource is configured in a satellite beam/group of beams specific way. In another approach, PLMN (public land mobile network) can be used as an indication. For example, if PLMN indicates that the cell is a satellite cell, then the resource is configured in a per satellite beam or per group of satellite beams manner.

B. Configuration of Transmission Resources Per Satellite Beam

Any combination of the following approaches can be utilized for configuring transmission resources per satellite beam.

In one approach, a common part of configuration of each beam can be included in a common system information, e.g. common SIB1, while separated Information Element (IE) can be used to configure satellite beam specific parameters, e.g., SIB1:i-th can be used for the i-th satellite beam. In some embodiments, the common part of the configuration can include at least one of the following information: cell selection information, cell access control related information, UAC barring information, ims-Emergency Supports, eCallOverIMS-Support, connection establishment failure information, SI-scheduling information, UE timer and constants, Uplink configuration, Downlink configuration, parameters used for pre-compensation (e.g. common TA within this beam, offset to delay the start of RAR window if the value of common TA is not reused as the offset), parameters used for extending the $k_2$ (scheduling offset) range (where $k_2$ is the duration between reception of DCI and corresponding scheduled transmission), beam select/ switch information (which may contain, beam index, beam location information, e.g., location information of beam center, beam coverage information).

The uplink configuration can include at least one of the UL frequency, configuration for initial uplink BWP (bandwidth part), which, in turn, can include at least one of the RACH configuration for contention based RACH, PUSCH configuration, PUCCH configuration, timing alignment timer, Subcarrier spacing to be used, frequency domain location and bandwidth of this bandwidth part, and whether to use the extended cyclic prefix for this bandwidth part. The downlink configuration can include at least one of the DL frequency, BCCH configuration, PCCH configuration, and configuration for initial downlink BWP, which, in turn, can include at least one of PDCCH configuration, PDSCH configuration, subcarrier spacing to be used, frequency domain location and bandwidth of this bandwidth part, and whether to use the extended cyclic prefix for this bandwidth part.

The beam specific system information can include at least one of connection establishment failure information, SI-scheduling information, UE timer and constants, uplink configuration, downlink configuration, parameters used for pre-compensation (e.g., common TA within this beam, offset to delay the start of RAR window if common TA is not reused), parameters used for extending the $k_2$ range (where $k_2$ is the duration between reception of DCI and corresponding scheduled transmission), and beam select/switch information (which may contain, beam index, beam location information, e.g., location information of beam center, beam coverage information).

The uplink information can include at least one of at least one of the UL frequency, configuration for initial uplink BWP (bandwidth part), which, in turn, can include at least one of the RACH configuration for contention based RACH, PUSCH configuration, PUCCH configuration, timing alignment timer, Subcarrier spacing to be used, frequency domain location and bandwidth of this bandwidth part, and whether to use the extended cyclic prefix for this bandwidth part. The downlink configuration can include at least one of the DL frequency, BCCH configuration, PCCH configuration, and configuration for initial downlink BWP, which, in turn, can include at least one of PDCCH configuration, PDSCH configuration, subcarrier spacing to be used, frequency domain location and bandwidth of this bandwidth part, and whether to use the extended cyclic prefix for this bandwidth part.

In instances where there is redundant information configured in common system information (e.g. MIB/SIB1/other system information) and the satellite beam specific system information (e.g. MIB/SIB1/other system information), the beam specific configuration may override the common configuration in common system information if the UE utilizes the corresponding beam resource to get access to the cell.

In another approach, separated IE can be used for each satellite beam, where each IE at least includes the same amount of information that is carried in the SIB1 defined in specification TS 38331. Furthermore, at least one of the following information can be further considered: Parameters used for pre-compensation (e.g. common TA within this beam, offset to delay the start of RAR window if common TA is not reused), parameters used for extending the $k_2$ range (where $k_2$ is the duration between reception of DCI and corresponding scheduled transmission), and beam select/switch information (which may contain, beam index, beam location information, e.g., location information of beam center, beam coverage information).

In another approach, a default system information (e.g., MIB/SIB1/other system information) per cell can be provided. For each beam, if there is any information element, which is different from that in the default configuration, the delta part can be provided per beam to override the default configuration.

In yet another approach, several typical system information (defined as default configuration, each default configuration is linked to a index) per cell can be broadcast to UE or predefined in specs, for each beam, only the index of one default configuration with or without delta part is broadcast to UE.

C. UEs Fetching of the Appropriate System Information

The UE may have to determine which of the above described configuration information is to be used in communicating with the BS. Any combination of the approaches discussed below can be utilized.

In one approach, different frequency bands can be configured to different satellite beam within the same satellite cell. For example, the mapping between different frequency and SIB1 of each beam can be included in MIB, or in the cell specific system information that carries the common part of information, e.g. common SIB1, if available. According to the frequency band used, UE can determine which beam specific system information is to be fetched and utilized.

In another approach, the UE can determine the update the beam specific system information based on the beam pattern information, satellite ephemeris as well as UE location information. For example, the beam pattern information can include at least one of the following: a number of satellite beams within the cell, the coverage of satellite beams, and the location information of the center of satellite beam. The beam pattern information, satellite ephemeris can be included in MIB or in the cell specific system information that carries the common part of information, e.g. common SIB1, if available.

In yet another approach, the UE can derive the beam specific information based on the SSB selected. For example, if the satellite beam and the SSB is one-to-one mapped, the UE can derive the beam specific system information to be used according to the SSB selected. The mapping between an SSB index and the beam specific system information can be included in the MIB or in the cell specific system information that carries the common part of information, e.g., common SIB1, if available.

D. Differentiating Beam Specific System Information

In some embodiments, any combination of the following approaches can be utilized in differentiating beam specific system information, such as, for example, beam specific SIB1.

In one approach, separated CORESET/SS can be configured for different SIB1 that configure beam specific resource with the same RNTI. In another approach, same CORESET/SS is used while different RNTI value can be used for scrambling beam specific SIB1. The above configuration for reception of beam specific SIB1 can be configured by the BS and included in the MIB, or in the cell specific system information that carries the common part of information, e.g. common SIB1, if available, or predefined in the specification.

E. Updating System Information

After acquiring the corresponding beam specific system information, e.g., the beam specific SIB1, the UE can store the beam specific SIB1 and the common SIB1 if available. The UE can update the beam specific SIB1 if at least one of the following condition is fulfilled:

Condition-1: The content in SIB1 is changed and triggers the system information change notification procedures; Condition-2: UE determines that the satellite beam used is changed; and Condition-3: UE moves out of valid area of the corresponding beam specific SIB1.

For above solutions identified for sections A-E, the system information can also be configured in a per group of satellite beams specific manner. The grouping of satellite beams can be configured by the BS in a spatial domain division way, or in frequency domain division way or in time domain division manner.

Aspect IV: Discontinuous Reception (DRX) Configuration

Hybrid Automatic Repeat reQuest (HARQ) is a combination of high-rate forward error-correcting coding and ARQ error-control. The HARQ is used in telecommunication systems for fast and reliable data transmissions by allowing the scheduler (e.g. BS) to adjust the transmission strategy, e.g. adjusting coding scheme, redundant versions etc., according to the feedback from the receiver (e.g. the UE in downlink transmission). Due to the large transmission delay in non-terrestrial networks, the feedback of receiver sometimes might not reflect the instantaneous condition of the channel, and therefore may not server as a reliable reference for determining the retransmission strategy. Further, waiting for the feedback to determine how to schedule the retransmission may significantly increase the data transmission delay. To cope with this problem, the HARQ feedback can be disabled, which means the scheduler can schedule retransmissions without waiting for the feedback of the receiver. The disabling of the feedback can be done in a per HARQ process manner, which indicates a UE can be scheduled continuously with the HARQ supporting the feedback and the HARQ not supporting the feedback.

Discontinuous reception (DRX) mechanism is introduced in the communication system for power saving at the UE's side, where the UE is allowed to go-to sleep periodically. Here, go-to sleep means that the UE is not expected to monitor the PDCCH. In current NR specification, the DRX function can be achieved by setting a series of timers, where the timers used to control DRX function is tightly linked with the feedback of HARQ. Therefore in case the feedback is disabled for a the HARQ process, the configuration of the DRX timers, e.g. the start time of the timer, the length of the timer or the presence of the timer, might be different from the DRX configured for the HARQ with feedback. Currently DRX is configured per Medium Access Control (MAC) entity, which means there is only one set of the DRX configuration is configured for a MAC entity. Since both the HARQ with and without feedback can be supported simultaneously for a MAC entity, and the DRX configuration is different for the HARQ with and without feedback, the current DRX configuration may have to be adjusted to meet new requirement. Following approaches can be considered for configuration of the DRX.

In a first approach, two set of configuration of the DRX can be configured for one MAC entity. For example, two separate information element (IE), e.g. DRX-Config-HARQ-enabled and DRX-Config-HARQ-disabled can be used separately to configure the DRX configuration for the HARQ with feedback and the HARQ without feedback. Each IE includes at least one of the following parameters:

drx-onDurationTimer: the duration at the beginning of a DRX Cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-RetransmissionTimerULOffset (per UL HARQ process): the offset used to delay the start of drx-RetransmissionTimerUL drx-RetransmissionTimerDLOffset (per DL HARQ process except for the broadcast process): the offset used to delay the start of drx-RetransmissionTimerDL drx-RetransmissionTimerOffset: the offset used to delay the start of both drx-RetransmissionTimerDL and drx-RetransmissionTimerUL drx-LongCycleStartOffset: the Long DRX cycle and drx-StartOffset which defines the subframe where the Long and Short DRX Cycle starts;

drx-ShortCycle: the Short DRX cycle;

drx-ShortCycleTimer: the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity.

drx-HARQ-RTT-TimerDLOffset (per DL HARQ process except for the broadcast process): the offset used to delay the start of drx-HARQ-RTT-TimerDL;

drx-HARQ-RTT-TimerULOffset (per UL HARQ process): the offset used to delay the start of drx-HARQ-RTT-TimerUL.

drx-HARQ-RTT-TimerOffset (per HARQ process): the offset used to delay the start of drx-HARQ-RTT-TimerUL and drx-HARQ-RTT-TimerDL.

For above mentioned parameters, at least one of the following can be configured differently for DRX configuration for the HARQ with feedback and the DRX configuration for the HARQ without feedback.

the start timing of the parameter
the stopping timing of the parameter
the length of the parameter
the presence of the parameter For a UE configured with the DRX configuration, if the DRX function is activated, the UE will select the corresponding DRX configuration to be used based on whether the HARQ is disabled (e.g., there is no need to send feedback or the scheduler can schedule retransmissions without waiting for feedback) or enabled (e.g., the HARQ feedback is required for each downlink transmission).

In a second approach, a common IE, e.g. the DRX-Config can be used to configure the common part of the DRX configuration for the HARQ process regardless of whether the feedback is required or not. And one additional IE, e.g., drx-Config-HARQ-disabled will be optionally included in the common IE in case the HARQ without feedback is supported simultaneously with the HARQ with feedback in one MAC entity. The common part of the DRX configuration includes at least one of the following:

drx-onDurationTimer: the duration at the beginning of a DRX Cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-RetransmissionTimerULOffset (per UL HARQ process): the offset used to delay the start of drx-RetransmissionTimerUL drx-RetransmissionTimerDLOffset (per DL HARQ process except for the broadcast process): the offset used to delay the start of drx-RetransmissionTimerDL drx-RetransmissionTimerOffset: the offset used to delay the start of both drx-RetransmissionTimerDL and drx-RetransmissionTimerUL drx-LongCycleStartOffset: the Long DRX cycle and drx-StartOffset which defines the subframe where the Long and Short DRX Cycle starts;

drx-ShortCycle: the Short DRX cycle;

drx-ShortCycleTimer: the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity.

drx-HARQ-RTT-TimerDLOffset (per DL HARQ process except for the broadcast process): the offset used to delay the start of drx-HARQ-RTT-TimerDL;

drx-HARQ-RTT-TimerULOffset (per UL HARQ process): the offset used to delay the start of drx-HARQ-RTT-TimerUL.

drx-HARQ-RTT-TimerOffset (per HARQ process): the offset used to delay the start of drx-HARQ-RTT-TimerUL and drx-HARQ-RTT-TimerDL.

IE used to configure extra DRX configuration to use in case the HARQ is disabled, e.g., drx-Config-HARQ-disabled, which includes as least one of the following:

drx-InactivityTimer;

drx-RetransmissionTimerDL (per DL HARQ process except for the broadcast process);

drx-RetransmissionTimerUL (per UL HARQ process);

drx-RetransmissionTimerULOffset (per UL HARQ process): the offset used to delay the start of drx-RetransmissionTimerUL;

drx-RetransmissionTimerDLOffset (per DL HARQ process except for the broadcast process): the offset used to delay the start of drx-RetransmissionTimerDL;

drx-RetransmissionTimerOffset: the offset used to delay the start of both drx-RetransmissionTimerDL and drx-RetransmissionTimerUL;

drx-HARQ-RTT-TimerDL (per DL HARQ process except for the broadcast process);

drx-HARQ-RTT-TimerUL (per UL HARQ process);

drx-HARQ-RTT-TimerDLOffset (per DL HARQ process except for the broadcast process): the offset used to delay the start of drx-HARQ-RTT-TimerDL drx-HARQ-RTT-TimerULOffset (per UL HARQ process): the offset used to delay the start of drx-HARQ-RTT-TimerUL.

drx-HARQ-RTT-TimerOffset (per HARQ process): the offset used to delay the start of drx-HARQ-RTT-TimerUL and drx-HARQ-RTT-TimerDL.

For a UE configured with the DRX configuration, if the DRX function is activated, the UE will select the corresponding DRX configuration to be used based on whether the HARQ is disabled or enabled. For example, if the HARQ is enabled, the UE will apply the DRX configuration indicated by the common DRX configuration (e.g. DRX-Config) IE except for the configuration included in specific IE for DRX when the HARQ is disabled, e.g., drx-Config-HARQ-disabled. For example, if the HARQ is disabled, the UE will apply the common part included in the DRX-Config together the extra configuration indicated by specific IE for DRX when the HARQ is disabled e.g., drx-Config-HARQ-disabled. If the same parameters is defined in both IEs, the UE will select the corresponding parameters according to whether the HARQ is disabled or not. Furthermore, in some examples, some parameters might be included in the common part but not in the specific IE for the HARQ without feedback, then those parameters maybe specified as not needed for the DRX when the HARQ is disabled. Those parameters can include at least one of the following:

drx-RetransmissionTimerDL;
drx-RetransmissionTimerUL;
drx-RetransmissionTimerULOffset;
drx-RetransmissionTimerDLOffset;
drx-RetransmissionTimerOffset;
drx-HARQ-RTT-TimerDL;
drx-HARQ-RTT-TimerUL;
drx-HARQ-RTT-TimerDLOffset;
drx-HARQ-RTT-TimerULOffset;
drx-HARQ-RTT-TimerOffset In a third approach, a common IE, e.g. DRX-Config-common can be used to configure the common part of the DRX configuration that is jointly used by the HARQ with and without feedback. And separated IEs can be used to configure the specific DRX parameters for the HARQ without feedback and the HARQ with feedback respectively. Or in another example, the common part of DRX configuration that is jointly used by the HARQ with and without feedback is configured in one IE (e.g., DRX-Config), and additionally separated IEs can be used to configure the specific DRX parameters for the HARQ without feedback and the HARQ with feedback respectively. And the separated defined IEs can be included in the IE used to configure the common part of the DRX configuration (e.g., DRX-Config). The common part of DRX configuration includes one or more parameters that has been mentioned in the common part of DRX configuration in the second approach discussed above. While the separated IEs for DRX configuration of HARQ with and without feedback may include one or more parameters that have been mentioned in the DRX configuration in the first approach discussed above.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method comprising:
determining, by a wireless communication device, to use a timing advance (TA) estimated by the wireless communication device for communication with a wireless communication node;
selecting, by the wireless communication device from a plurality of types of random access channel (RACH) procedures, a type of RACH procedure to communicate with the wireless communication node;
initiating, by the wireless communication device, a RACH procedure by transmitting a message to the wireless communication node according to the selected type of RACH and to the TA estimated by the wireless communication device;
starting, by the wireless communication device, a random access response (RAR) window after transmitting the message;
monitoring, by the wireless communication device, receipt from the wireless communication node a scheduling information for reception of a response message during the RAR window; and
receiving, by the wireless communication device from the wireless communication node, a response message according to the scheduling information,
wherein for the RACH procedure pre-compensated based on the TA estimated by the wireless communication device, the start of the RAR window is delayed by the wireless communication device based on an offset of a network configuration.

2. The method of claim 1, wherein the plurality of types of RACH procedures comprise a 4-step RACH.

3. The method of claim 1, wherein the plurality of types of RACH procedures comprise a 2-step RACH.

4. The method of claim 1, further comprising:
determining whether to use the TA estimated by the wireless communication device according to RACH resource configuration information from the wireless communication node, prior to initiating the RACH communication.

5. The method of claim 4, further comprising:
receiving the RACH resource configuration information from the wireless communication node via at least one of broadcast information or RRC signaling information.

6. The method of claim 4, wherein the RACH resource configuration information includes a configuration of one or more RACH resource pools.

7. The method of claim 6, further comprising:
determining whether to use the TA estimated by the wireless communication device according to a presence of multiple RACH resource pools.

8. The method of claim 6, wherein the configuration of one or more RACH resource pools includes at least one TA usage enable indicator, the method further comprising:
determining whether to use the TA estimated by the wireless communication device according to the at least one TA usage enable indicator.

9. The method of claim 6, wherein the configuration of RACH resource pool includes at least one RACH type indicator, the method further comprising: selecting the type of RACH procedure according to the at least one RACH indicator.

10. The method of claim 1, further comprising:
determining a search space, by the wireless communication device, according to control resource configuration information received from the wireless communication node, prior to initiating the RACH communication.

11. The method of claim 10, wherein the control resource configuration information includes a configuration of one or more CORESET, and a mapping relationship between a CORESET and a RACH resource pool, the method further comprising determining the CORESET to be used according to the RACH resource pool selected for initiating RACH and the mapping relationship.

12. The method of claim 1, further comprising:
determining, by the wireless communication device, according to the determination of whether to use the TA estimated by the wireless communication device, at least one parameter of a timing window for a response message received from the network communication node.

13. The method of claim 1, wherein the wireless communication node includes a satellite based node.

14. The method of claim 1, wherein the TA is estimated by the wireless communication device based on location information and an available ephemeris of a satellite.

15. The method of claim 1, wherein the TA estimated by the wireless communication device is reported by the wireless communication device to the wireless communication node during the RACH procedure.

16. The method of claim 15, wherein the estimated TA of the wireless communication device is delivered by a media access control (MAC) control element (CE).

17. A wireless communication device, comprising:
at least one processor configured to:
  determine to use a timing advance (TA) estimated by the wireless communication device for communication with a wireless communication node;
  select a type of random access channel (RACH) procedure to communicate with the wireless communication node from a plurality of types of RACH procedures;
  initiate a RACH procedure by transmitting a message to the wireless communication node according to the selected type of RACH and to the TA estimated by the wireless communication device;
  start a random access response (RAR) window after transmitting the message;
  monitor receipt from the wireless communication node a scheduling information for reception of a response message during the RAR window; and
  receive, via a receiver from the wireless communication node, a response message according to the scheduling information,
  wherein for the RACH procedure pre-compensated based on the TA estimated by the wireless communication device, the start of the RAR window is delayed by the wireless communication device based on an offset of a network configuration.

18. The wireless communication device of claim 17, wherein the plurality of types of RACH procedures comprise a 4-step RACH.

19. The wireless communication device of claim 17, wherein the plurality of types of RACH procedures comprise a 2-step RACH.

* * * * *